United States Patent [19]
Pardi et al.

[11] Patent Number: 5,897,289
[45] Date of Patent: Apr. 27, 1999

[54] TUBE ALIGNMENT AND DELIVERY APPARATUS

[75] Inventors: Ronald Pardi, Canton; James C. Rollinson, Westland; Daniel J. Stark, Woodhaven; William J. Maybee, Brighton; Eddy G. Mizzi, Allen Park; Walter Kowalewski, Canton; Paul Krause, Brighton, all of Mich.

[73] Assignees: Ford Motor Company, Dearborn; Progressive Tool Industries, Co., Southfield, both of Mich.

[21] Appl. No.: 08/792,642

[22] Filed: Jan. 31, 1997

[51] Int. Cl.⁶ .................................................. B65G 57/00
[52] U.S. Cl. ................................... 414/789.1; 198/397.03
[58] Field of Search ............................. 198/396, 397.03, 198/443; 414/789.1

[56] References Cited

U.S. PATENT DOCUMENTS

| | | |
|---|---|---|
| 3,385,457 | 5/1968 | Zinn ..................................... 414/789.1 |
| 3,733,673 | 5/1973 | Young et al. . |
| 4,274,531 | 6/1981 | Whitmore ........................... 198/397.03 |
| 4,321,739 | 3/1982 | Martin et al. . |
| 4,486,933 | 12/1984 | Iwase et al. . |
| 4,611,375 | 9/1986 | Zapawa . |
| 4,637,132 | 1/1987 | Iwase et al. . |
| 4,637,133 | 1/1987 | Freeman . |
| 4,984,678 | 1/1991 | Fauchard ................................ 198/396 |
| 5,022,814 | 6/1991 | Breda et al. . |
| 5,120,189 | 6/1992 | Breda et al. . |
| 5,157,944 | 10/1992 | Hughes et al. . |
| 5,431,530 | 7/1995 | Kobayashi et al. .................. 414/789.1 |

*Primary Examiner*—Joseph E. Valenza
*Attorney, Agent, or Firm*—Raymond L. Coppiellie, Esq.

[57] ABSTRACT

An apparatus for alignment and delivery of tubing for use in manufacture and assembly of heat exchangers used for controlling temperature conditions. The apparatus includes a drum into which bulk tubes are loaded. The drum aligns and deposits the tubes onto a conveyor which transports the tubes to a feed magazine. An alignment mechanism aligns the tubes within the feed magazine for use in the process of the assembly of the heat exchanger.

20 Claims, 6 Drawing Sheets

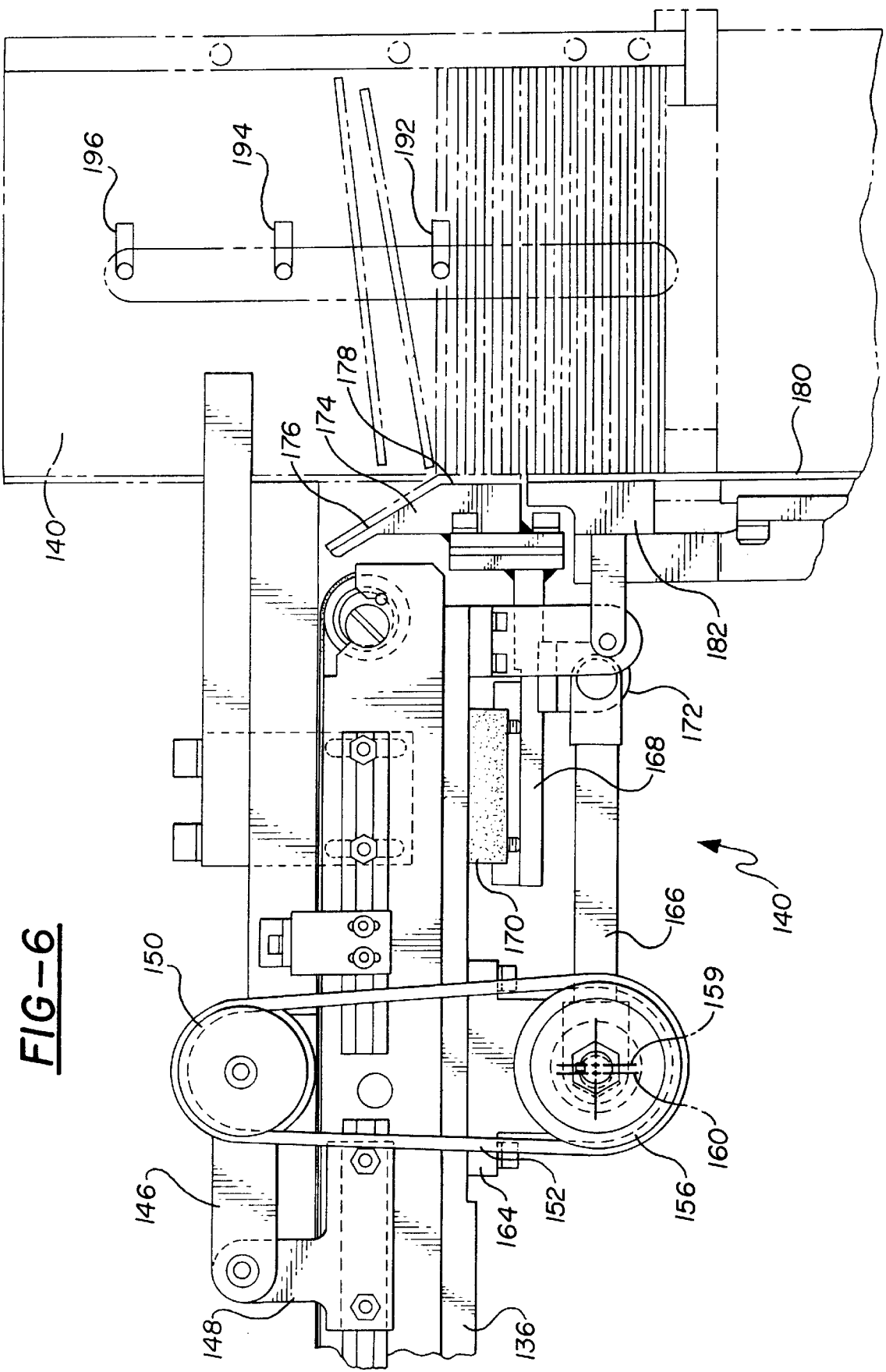

TUBE ALIGNMENT AND DELIVERY APPARATUS

BACKGROUND OF THE INVENTION

1. Field of the Invention

The present invention relates generally to a tube alignment and delivery apparatus for use in a manufacturing process and, more specifically, to an apparatus used to align and load a flow tube in a feed magazine used in the manufacture and assembly of heat exchangers.

2. Description of the Related Art

In a conventional apparatus for manufacture and assembly of a heat exchanger of a parallel tube and fin type, a plurality of tubes and fins are stacked adjacent one another to form a tube and fin bundle. Once the tube and fin bundle is assembled, side plates and upper and lower headers are attached. The process of assembling the heat exchanger may be accomplished manually or through automated machinery. If machine assembled, a plurality of tubes are manually loaded into a feed magazine from which they are withdrawn during the manufacturing and assembly process. This requires an individual to remove tubes from storage containers and physically place the tubes in the feed magazine either one at a time or in small groups. Such a procedure is both time consuming and unwieldy.

Therefore, it is advantageous to provide an apparatus for receiving tubes in bulk and aligning and delivering the tubes to a feed magazine for use in manufacture and assembly of a heat exchanger. Such an apparatus eliminates the need for manual labor to load the tubes in a feed magazine.

SUMMARY OF THE INVENTION

The present invention is an apparatus for alignment and delivery of a plurality of tubes to a feed magazine for use in connection with an apparatus for assembling or manufacturing a heat exchanger. The apparatus includes a drum receiving a plurality of tubes. The drum aligns and deposits the tubes on a conveyor that transports and discharges properly aligned tubes in a feed magazine for use in a manufacturing process. The apparatus further includes an alignment mechanism that aligns the tubes in the feed magazine after the tubes are discharged from the conveyor into the feed magazine.

One advantage of the present invention is that a large number of tubes are segregated, aligned, and placed in a feed magazine in a facile and economical manner.

Other features and advantages of the present invention will be readily appreciated as the same becomes better understood after reading the subsequent description when considered in connection with the accompanying drawings.

BRIEF DESCRIPTION OF THE DRAWINGS

FIG. 6 is an elevational view of an alignment apparatus according to the present invention.

DESCRIPTION OF THE PREFERRED EMBODIMENT(S)

Tubes 12 form an integral part of a heat exchanger (not shown). The tubes 12 are manufactured in a tube mill from an extruded metal such as aluminum. During the manufacturing process, the extruded tube is severed into predetermined lengths. It is normal for a manufacturer of a heat exchanger to receive tubes 12 in bulk. The tubes 12 must be aligned and loaded into a feed magazine 14. During the manufacturing and assembly process, the tubes 12 are automatically withdrawn from the feed magazine 14 as used in the assembly of the heat exchanger.

Figure 1:
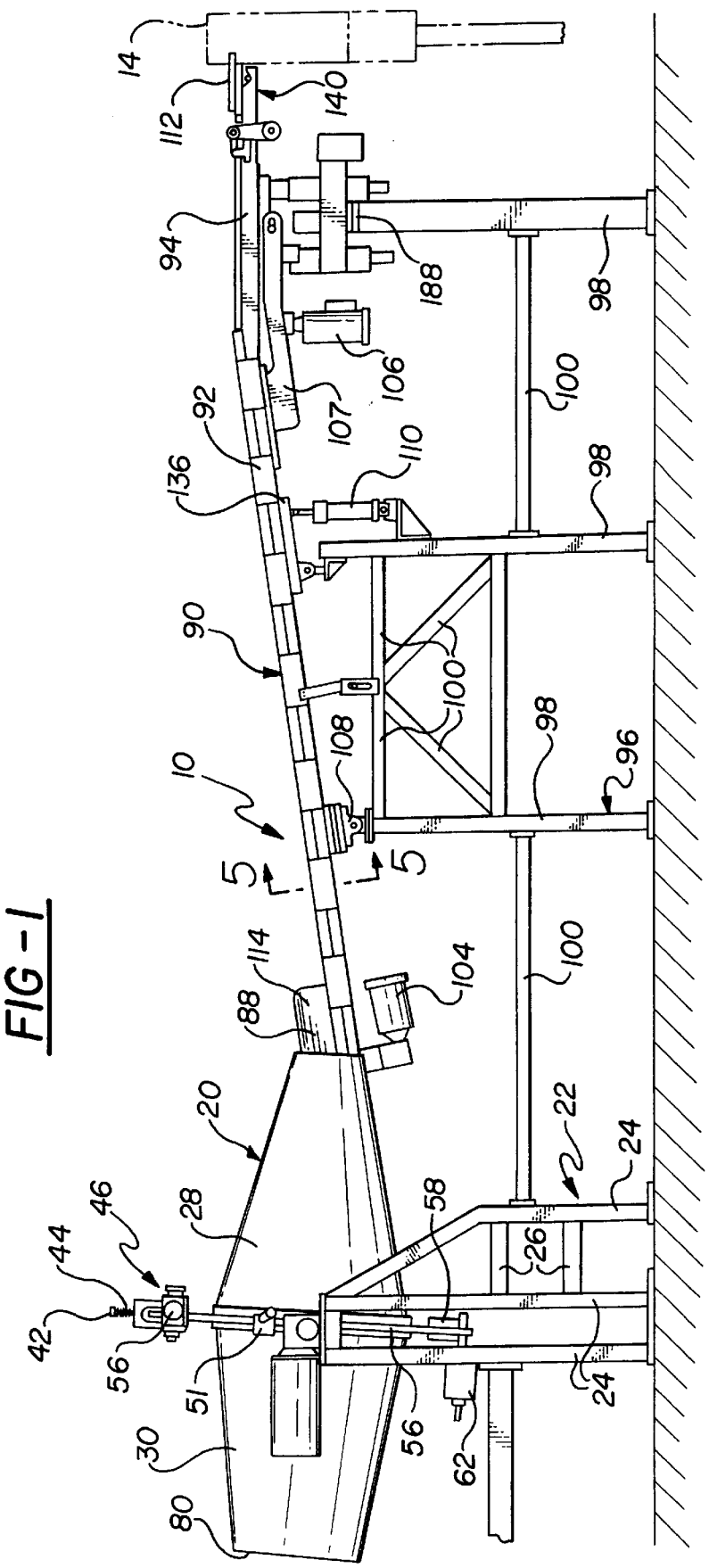
FIG. 1 is an overall elevational view of an apparatus according to the present invention.

One embodiment of the tube alignment and delivery apparatus 10 is shown in FIG. 1. The apparatus 10 is used to align a plurality of tubes 12, received in bulk, and deliver and load the tubes 12 in the feed magazine 14 as a preliminary step in the manufacture of a heat exchanger. While disclosed herein for use with tubes 12, the tube alignment and delivery apparatus 10 may also be used with other workpieces.

As shown in FIG. 1, the apparatus 10 includes a drum 20 into which the tubes 12 are loaded in bulk. A conveyor, seen generally at 90, receives the tubes 12 from the drum 20 and delivers them to the feed magazine 14. An alignment mechanism 140 aligns the tubes 12 within the feed magazine 14. Thus, the entire apparatus 10 enables a plurality of tubes 12 to be loaded in the feed magazine 14 for use in a manufacturing process in a facile and economical manner.

Figure 2:
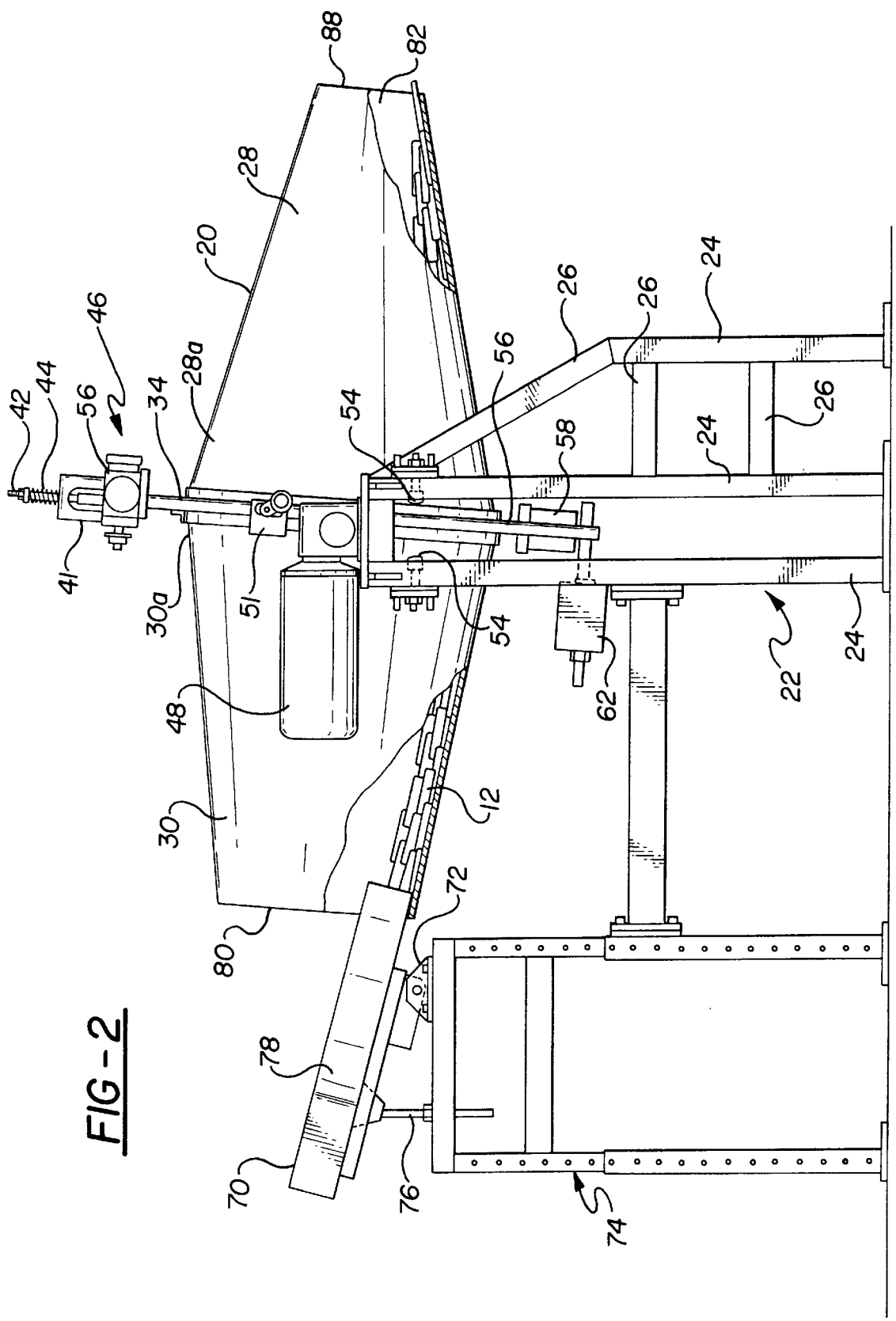
FIG. 2 is an elevational view of a drum of the present invention.

Turning now to FIG. 2, FIG. 2 shows a frame 22 formed of a plurality of leg members 24 and braces 26. A drum 20 is rotatably mounted on the frame 22 through an annular support 34. The annular support 34 is pivotally mounted to the frame 22 through bearings 35 secured to the frame 22. The drum 20 includes a front conical section 28 and a rear conical section 30. The conical sections 28, 30 are joined at their respective large ends 28a, 30a by an outwardly extending flange 32. The drum 20 is supported within the annular support 34 by a plurality of support rollers 36 and alignment rollers 38 secured to the annular support 34 by roller brackets 39. The support rollers 36 and alignment rollers 38 engage the flange 32 of the drum 20 and support the drum 20 for rotational movement. The annular support 34 further includes a drive roller 40 mounted within a U-shaped bracket 41. A spring 44 mounted over a rod 42 presses the drive roller 40 against the flange 32. A drum motor 48 provides power to rotate the drum 20 through a drive linkage, seen generally at 46. The drive linkage 46 includes a drive belt 50, a reducer 52 and a second drive belt 57 interconnecting the reducer 52 to the drive roller 40. The drive linkage 46 further includes take-up or idler pulleys 51, 53. Consequently, activation of the drive motor 48 transfers power to the drive roller 40 causing the drum 20 to rotate within the annular support 34.

Figure 3:
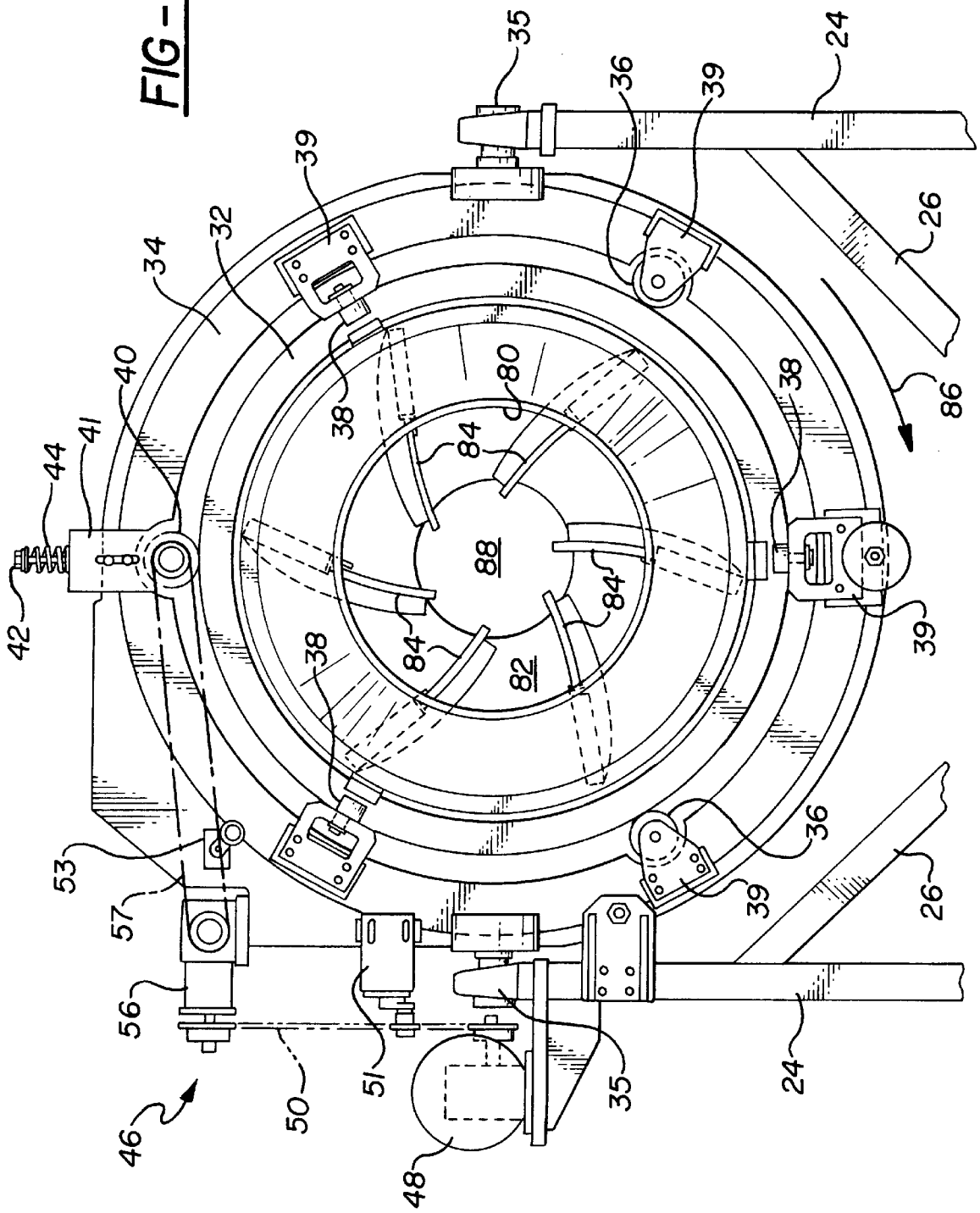
FIG. 3 is an end view of the drum and apparatus with portions omitted for clarity.

As shown in FIGS. 2 and 3, the annular support 34 is pivotally mounted through a pair of bearings 35 to the frame 22. A pair of stops 54 secured to the frame 22 define the outer limits of movement of the drum 20. An arm 56 extends downwardly from the annular support 34 and engages an adjustment rod 60 situated in a shock mount 62. Movement of the arm 56 along the adjustment rod 60 enables the angular position of the outlet opening 88 of the drum 20 to be varied, and thus, the rate of discharge of the tubes 12 from the drum 20 can be varied. A counter weight 58 is attached to the drum 20 for balance.

A feed chute 70 is pivotally mounted through a bracket and pin assembly 72 to a feed chute frame 74. The feed chute frame 74 is attached to the frame 22 supporting the drum 20. As shown in FIG. 2, the feed chute 70 includes an adjustment rod 76 to position the feed chute 70. Side walls 78 on the feed chute 70 funnel the tubes 12 into the drum 20 through an inlet opening 80 on the drum 20.

The drum 20 includes a drum cavity 82 receiving the tubes 12 loaded through the feed chute 70. The drum cavity 82 includes a plurality of vanes 84 secured to the inner wall 83 of the drum cavity 82. As the drum 20 rotates in a clockwise direction shown by the arrow 86 (see FIG. 3), the vanes 84 engage and align the tubes 12 in a longitudinal direction, i.e., along their longitudinal axis. Varying the angle of the outlet opening 88 and the speed of rotation of the drum 20, varies the discharge rate of the tubes 12 from the drum 20.

Figure 4:
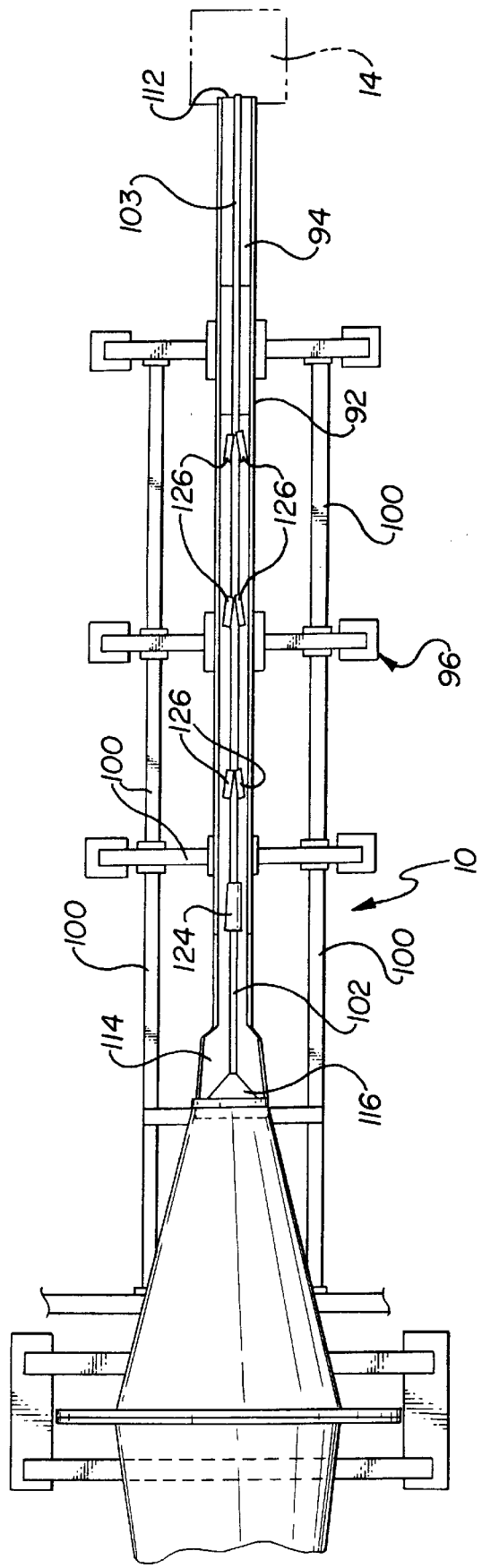
FIG. 4 is a top view of a conveyor according to the present invention.

Turning now to FIGS. 1 and 4, a conveyor, seen generally at 90, for transporting the aligned tubes 12, is shown. The conveyor 90 includes a first inclined section 92 and a second substantially horizontal section 94. The conveyor 90 is mounted to a conveyor frame 96 formed of a plurality of upright members 98 and cross members 100. The inclined section 92 and the substantially horizontal section 94 are both belt-type conveyors. The inclined section 92 includes a first drive motor 104 to drive a first conveyor or inclined section belt 102, and the second substantially horizontal section 94 includes a second drive motor 106 to drive a second or substantially horizontal section conveyor belt 103. While the conveyor 90 is shown herein in two sections, one inclined and one substantially horizontal, the conveyor 90 may be formed of a single section, either inclined or horizontal, depending upon the ultimate destination and discharge position of the conveyor 90. One attribute of the conveyor 90 is to transfer and deliver the aligned tubes 12 from the drum 20 to the feed magazine 14.

As illustrated in FIG. 1, the inclined section 92 of the conveyor 90 is connected to the substantially horizontal section 94 by a bracket 107. Thus, the two conveyor sections 92 and 94 operate in a unitary fashion. The inclined section 92 is pivotally mounted to the conveyor frame 96 through a bracket and pin assembly 108. The bracket and pin assembly 108 allows the position of a discharge end 112 of the conveyor 90 to vary with respect to the feed magazine 14. A power cylinder 110 positioned between the conveyor frame 96 and the conveyor base 136 provides the power to move the discharge end 112 of the conveyor 90 to various positions along the feed magazine 14.

Figure 5:
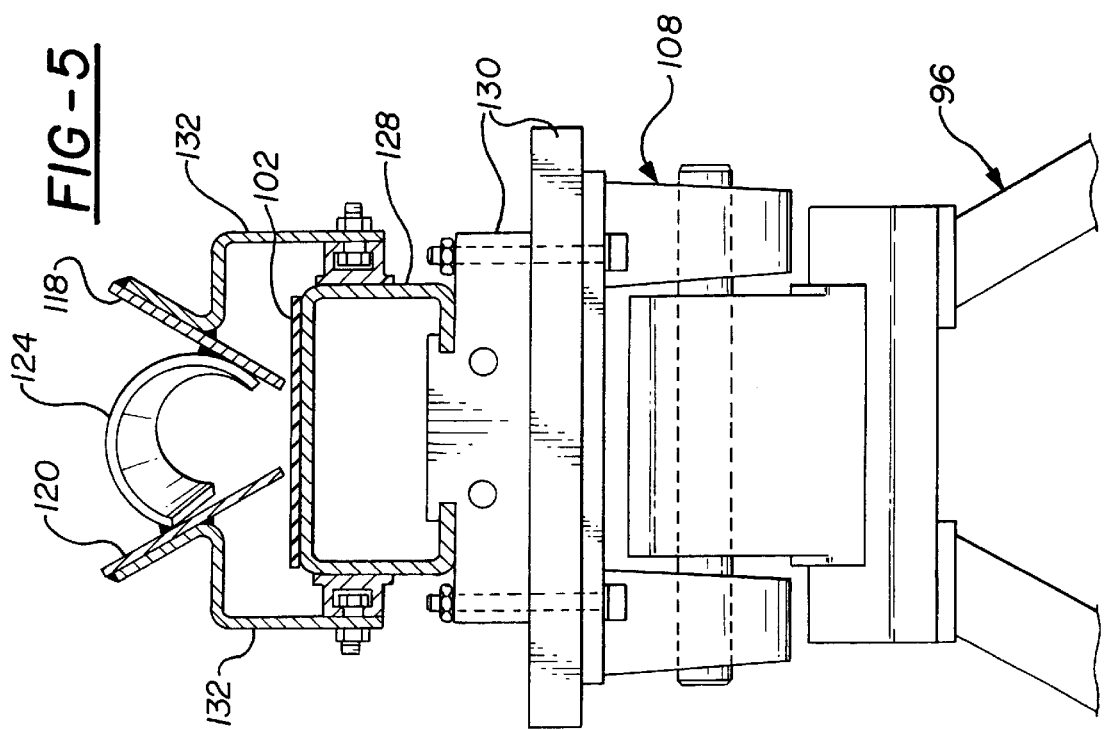
FIG. 5 is a cross-sectional view taken on a plane of line 5—5 of FIG. 1.

Turning to FIGS. 1 and 4, a hopper 114 is positioned on the conveyor 90 adjacent the outlet opening 88 of the drum 20 and receives the tubes 12 as they exit the drum 20. The hopper 114 guides the tubes 12 onto the first conveyor belt 102 of the inclined section 92 of the conveyor 90. A resilient flap 116 positioned adjacent the hopper 114 ensures that the tubes 12 lie flat on the first conveyor belt 102 upon exiting the drum 20. The construction of conveyor 90 is similar for both the inclined section 92 and the substantial horizontal section 94 and is shown in FIG. 5. The conveyor 90 includes a C-shaped channel 128 supporting the first conveyor belt 102. As shown in FIG. 5, the C-shaped channel 128 is attached to the conveyor frame 96 via a mounting member 130. Side walls 132 extend upward from the C-shaped channel 128 and support a pair of guide plates 118, 120 positioned in a V-shape. The tubes 12 travel along the first conveyor belt 102 between the guide plates 118, 120. Further included is a short cover 124 enclosing the first conveyor belt 102 to facilitate contact between the tubes 12 and the first conveyor belt 102.

The guide plates 118, 120 further include a plurality of ribs 126 extending inward and along the direction of the first conveyor belt 102. The ribs 126 aid in keeping the tubes 12 in contact with the first conveyor belt 102. Upon reaching the discharge end 112 of the conveyor 90, the tubes 12 are deposited in the feed magazine 14.

Figure 7:
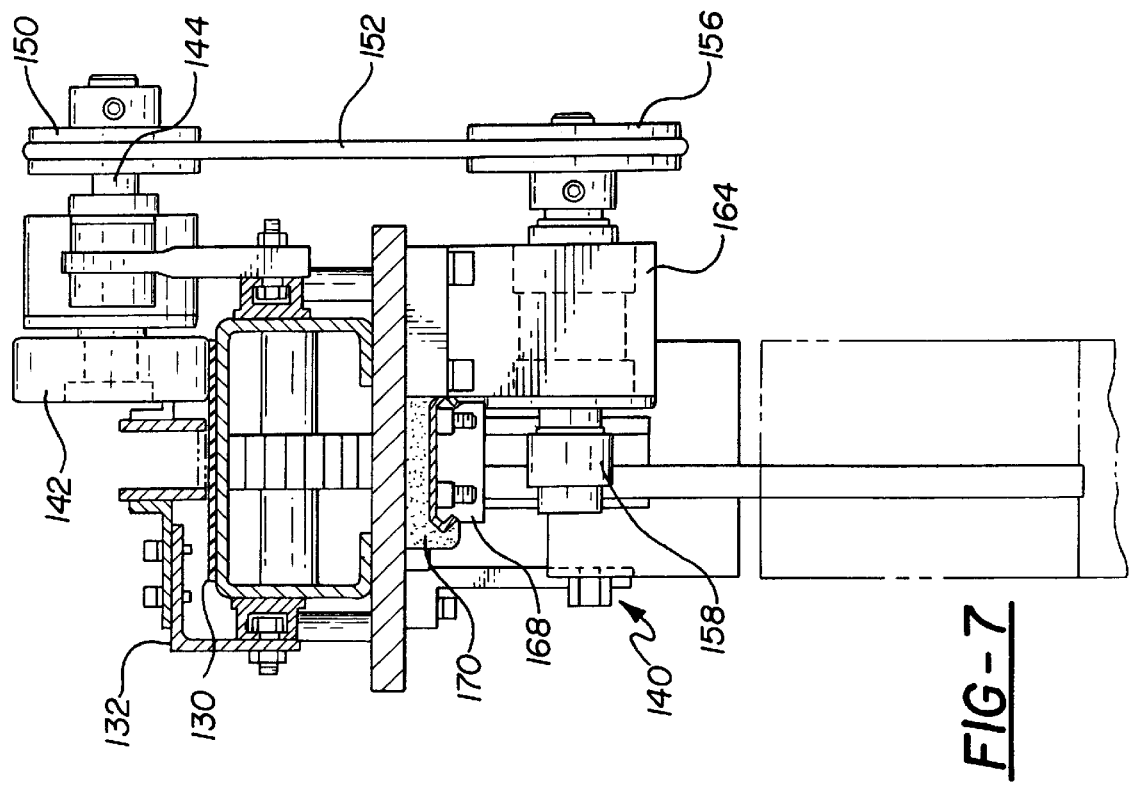
FIG. 7 is a cross-sectional view taken on a plane of line 7—7 of FIG. 6.

An alignment mechanism, seen generally at 140, is positioned on the discharge end 112 of the conveyor 90 to aid in properly aligning the tubes 12 in the feed magazine 14. As illustrated in FIGS. 6 and 7, the alignment mechanism 140 includes a drive wheel 142 rotatably mounted to a shaft 144. The shaft 144 is supported on an arm 146 pivotally secured to a mounting bracket 148 attached to the conveyor base 136. A drive pulley 150 is secured to the shaft 144 and is coupled by a drive belt 152 to a driven pulley 154 journaled within a bracket 164 secured to the conveyor base 136. The drive belt 152 is made of a resilient material and pulls the drive pulley 150 downward into contact with the second conveyor belt 103 of the substantially horizontal conveyor section 94.

The drive pulley 154 is attached to a driven shaft 156. The driven shaft 156 includes an eccentric portion 158 having a center line 160 offset from the center line 159 of the driven shaft 156. A connecting rod 166 is connected on one end to the eccentric portion 158 and on the opposite end to a projection 172 from a slide 168. The slide 168 is mounted for reciprocal motion in a guideway 170 attached to the conveyor base 136. Thus, movement of the second conveyor belt 103 causes reciprocal movement of the slide 168 within the guideway 170. Attached to the slide 168 on an end adjacent the feed magazine 14, is a head 174 having an inclined surface 176 and a vertical nose surface 178. As shown by the dotted lines in FIG. 6 representing movement of the head 174, the inclined surface 176 and vertical nose surface 178 cooperate to properly align the tubes 12 within the feed magazine 14. A keeper plate 180 secured via a bracket 182 to the conveyor base 136 keeps the tubes 12 aligned within the feed magazine 14 as the alignment mechanism 140 travels along the feed magazine 14.

A plurality of sensors 190 are positioned on the feed magazine 14. During normal operation, the tube feed rate is calculated to keep up with the rate of use. The rotation speed of the drum 20 and its angular position are set such that the tubes 12 enter the feed magazine 14 at a rate equal to the rate the tubes 12 are withdrawn for use in the manufacturing operation. In operation, the discharge end 112 of the conveyor 90 is placed in its lower most position, i.e., against a lower stop 188. A first or lower sensor 192 detects the presence of tubes 12. If no tubes 12 are detected, the drum 20 continues to operate and tubes 12 are discharged onto the conveyor 90. If tubes 12 are detected at the first sensor 192, the drum 20 is turned off. However, a number of tubes 12 still remain on the conveyor 90. Rather than turn the conveyor 90 off, the conveyor 90 continues to operate and delivers the remaining tubes 12 to the feed magazine 14. It is recognized that the tubes 12 remaining on the conveyor 90 would fill the feed magazine 14 to a level higher than the discharge end 112 of the conveyor 90. Thus, when the tubes 12 reach the height or level of a second sensor 194, the power cylinder 110 is activated to raise the discharge end 112 providing additional space in the feed magazine 14 for the tubes 12.

In the instant embodiment, the discharge end 112 is raised approximately three inches to allow additional space within the feed magazine 14. The height adjustment may be variable and multiple sensors used to move or adjust the height of the discharge end 112 in smaller increments depending upon the number of tubes 12 on the conveyor 90. Finally, an upper level sensor 196 can be used to stop the conveyor 90 if the tube height reaches a certain level within the feed magazine 14. When the tubes 12 are withdrawn from the feed magazine 14 and the level reaches the upper level sensor 196, the drum 20 and conveyor 90 are turned back on. When the level of tubes 12 falls to the first sensor, the discharge end 112 of the conveyor 90 is lowered into contact with the stop 188.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A workpiece delivery apparatus for supplying a workpiece to a feed magazine comprising:
    a drum having at least one open end mounted for rotational movement on a frame, said drum having a drum cavity and a plurality of vanes mounted within said drum cavity;
    a conveyor, said conveyor including a conveyor frame, a conveyor base supported on said conveyor frame, a conveyor belt supported on said base and a drive motor connected to and driving said conveyor belt; and
    an alignment mechanism connected to said conveyor for reciprocal movement and engaging said workpiece to properly align the workpiece in said feed magazine.

2. A workpiece delivery apparatus as set forth in claim 1 including a power cylinder secured between said conveyor frame and said conveyor base, said conveyor base pivotally mounted on said conveyor frame such that said power cylinder when activated moves a discharge end of said conveyor.

3. A workpiece delivery apparatus as set forth in claim 1 including a hopper positioned on one end of said conveyor adjacent said drum, said hopper receiving said workpiece as the workpiece exits said drum through said open end.

4. A workpiece delivery apparatus as set forth in claim 1 wherein mounting said drum for rotational movement includes an annular support mounted to said frame and a plurality of support rollers secured to and supporting said drum within said annular support.

5. A workpiece delivery apparatus as set forth in claim 4 including a drive motor attached to said frame supporting said drum, a drive roller secured to said annular support and engaging said drum, and a drive linkage connecting said drive motor to said roller such that the drive motor supplies power to said drive roller to rotate said drum within said annular support.

6. A workpiece delivery apparatus as set forth in claim 4 including a plurality of bearings secured to said frame supporting said drum, said annular support pivotally attached through said bearings to said frame such that said drum is pivotally supported on said frame.

7. A workpiece delivery apparatus as set forth in claim 1 wherein said drum is formed of a pair of cone-shaped sections, each of said sections being joined together at their respective large ends, said drum having openings at each end, said openings defining an inlet end and an outlet end.

8. A workpiece delivery apparatus as set forth in claim 7 including a feed chute frame and a feed chute mounted on said feed chute frame.

9. A workpiece delivery apparatus as set forth in claim 1 wherein said conveyor includes a first inclined section and a second horizontal section, said inclined sections each having separate and distinct drive motors and conveyor belts.

10. A workpiece delivery apparatus as set forth in claim 1 wherein said alignment mechanism includes a drive wheel secured to said conveyor and engaging said conveyor belt, wherein movement of said conveyor belt causes said drive wheel to rotate, a shaft journaled on said conveyor frame attached to and rotating with said drive wheel, a drive pulley attached to said shaft and coupled via a drive belt to a driven pulley, and a second shaft attached to and driven by said driven pulley, said second shaft coupled through a connecting rod to a slide member slidably supported on said conveyor frame as a head attached to said slide member.

11. A workpiece delivery apparatus as set forth in claim 1 including at least one sensor, said sensor determining the presence of tubes in said feed magazine and controlling the operation of said drum.

12. A workpiece delivery apparatus as set forth in claim 2 including a sensor monitoring the presence of tubes in said feed magazine, said sensor coupled to said power cylinder and activating said power cylinder to move the discharge end of said conveyor.

13. A workpiece delivery apparatus for supplying a workpiece to a feed magazine comprising:
    a drum mounted for rotational movement on a frame, said drum including a drum cavity and a plurality of vanes mounted within said drum cavity;
    a conveyor including a conveyor frame and a conveyor base supporting a conveyor belt;
    a pair of guide rails positioned on said conveyor adjacent said belt, said guide rails forming a channel;
    a slide slidably mounted within a guideway attached to the conveyor frame;
    an alignment mechanism including a drive wheel attached to said conveyor and engaging said conveyor belt, said drive wheel driving a drive pulley and a drive linkage interconnecting said drive pulley with said slide to move said slide in a reciprocal manner to align the workpiece in the feed magazine.

14. A workpiece: delivery apparatus as set forth in claim 13 wherein said conveyor includes a first inclined section and a second horizontal section.

15. A workpiece delivery apparatus as set forth in claim 13 including a power cylinder secured to said conveyor frame and said conveyor base, said conveyor base being pivotally mounted to said conveyor frame wherein said power cylinder is operative to move a discharge end of said conveyor.

16. A workpiece delivery apparatus as set forth in claim 15 including a hopper positioned on said conveyor adjacent said drum, said hopper including a resilient flap engaging said workpiece and exerting a pressure on said workpiece to ensure said workpiece maintains contact with said conveyor belt.

17. A workpiece delivery apparatus as set forth in claim 13 including an annular support having a plurality of support rollers attached thereto, said drum including a flange, said flange contacting said support rollers to support said drum for rotational movement, a drive motor attached to said frame supporting said drum, and a drive roller secured to said annular support and engaging said drum and a drive linkage connecting said drive motor to said drive roller.

18. A workpiece delivery apparatus for supplying a workpiece to a feed magazine comprising:

a drum mounted for rotational movement on a frame, said drum including a plurality of vanes mounted within a drum cavity, said drum having two open ends, one end being an outlet end and the other end being an inlet end;

a conveyor, said conveyor including a conveyor belt disposed for movement thereon, a drive motor connected to and driving said conveyor belt;

a hopper positioned on one end of said conveyor adjacent the output end of said drum, said hopper receiving said workpiece as said workpiece exits said drum;

a pair of guide rails positioned on said conveyor adjacent said conveyor belt, said guide rails forming a channel in which said workpiece travels;

a power cylinder secured between conveyor frame and a conveyor base, said conveyor base being pivotally mounted to said conveyor frame wherein said power cylinder is operative to move a discharge end of said conveyor; and an alignment mechanism connected to said conveyor base, said alignment mechanism aligning said workpiece in said feed magazine.

19. A workpiece delivery apparatus as set forth in claim 18 wherein said alignment mechanism includes a drive wheel secured to said conveyor base and engaging said conveyor belt such that movement of said conveyor belt causes said drive wheel to rotate, a shaft journaled on said conveyor base is attached to and rotates with said drive wheel, a drive pulley is attached to said shaft and coupled via a drive belt to a driven pulley, and a second shaft attached to and driven by said driven pulley, said second shaft coupled through a connecting rod to a slide member slidably supported on said conveyor base.

20. A workpiece delivery apparatus as set forth in claim 18 wherein said drum is mounted on a plurality of support rollers attached to an annular support, a drive motor is attached to said frame supporting said drum, a drive roller is secured to said annular support and engages said drum, and a drive linkage connecting said drive motor to said drive roller.

* * * * *